W. B. ROSEVEAR, Jr.
PLASTIC COMPOSITION.
APPLICATION FILED SEPT. 4, 1914.
1,256,042.
Patented Feb. 12, 1918.
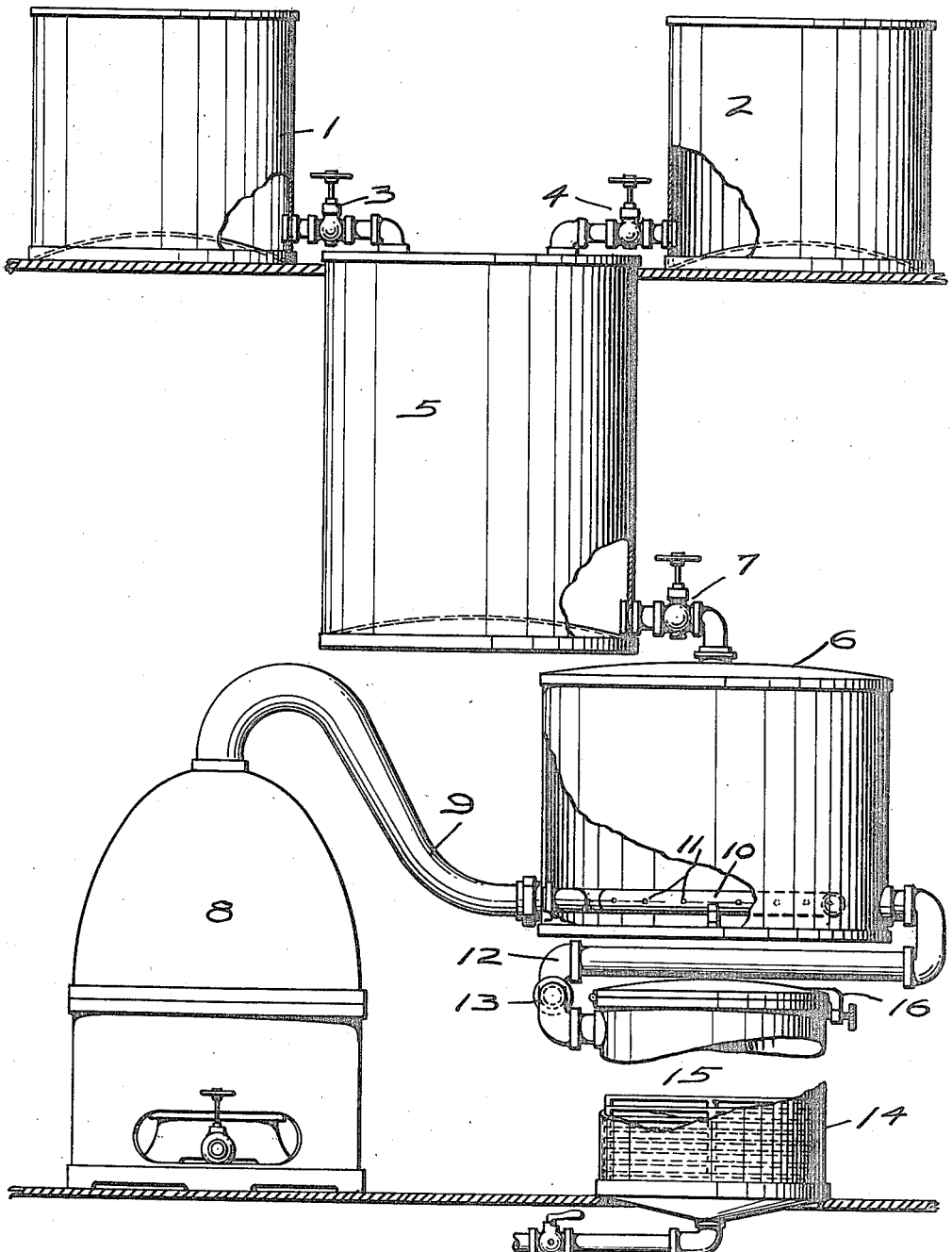
WITNESSES:
INVENTOR.
William B. Rosevear, Jr.
by

UNITED STATES PATENT OFFICE.

WILLIAM B. ROSEVEAR, JR., OF TOLEDO, OHIO.

PLASTIC COMPOSITION.

1,256,042.                   Specification of Letters Patent.   Patented Feb. 12, 1918.

Application filed September 4, 1914.   Serial No. 860,189.

*To all whom it may concern:*

Be it known that I, WILLIAM B. ROSEVEAR, Jr., a citizen of the United States, and a resident of Toledo, in the county of Lucas and State of Ohio, have invented a certain new and useful Plastic Composition; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a composition of a material for forming the body of wax crayons, chalks, plastic and molding materials for the manufacture of building moldings and ornaments, carton-pierres, plasters, cements and mortars, for cold water paint, putty and artificial stone, brick and tile.

The process consists in introducing carbon dioxid gas into a milk of lime solution in the presence of the juices of vegetable compounds. The composition may be formed in the clarification and precipitation of the foreign elements contained in the juices of sugar beet.

The invention in the process and in the composition produced thereby may be greatly varied and the same results accomplished. I will describe hereinafter one combination of ingredients and one of the processes involving the use of my invention, which, however, may be greatly altered without departing from the scope or spirit of the invention.

An apparatus used in the conduct of my process is conventionally illustrated in the accompanying drawings. A great variety of forms of apparatus may be used to produce the compositions containing my invention, the one shown being illustrative only.

The figure illustrates a system of producers and vats forming the composition.

In the figure, 1 indicates a reservoir or vat for containing saccharine juices or vegetable juices of any form, the pulp of which forms in the composition a binder of the materials without injuring the setting action of the composition in the formation of mortar, plastics, etc. The juices may be formed by crushing, boiling, and the like, and directed into the vat 1. 2 is a vat for containing milk of lime, that is, calcium hydroxid in solution. The two solutions from the vat 1 may be directed through the valves 3 and 4 into the receptacle 5 where they are intimately mixed. Any suitable agitator may be used in mixing the solutions, if desired. The solutions are then directed into a closed receptacle 6 through the valve 7.

8 is a retort, kiln or furnace for burning the lime and producing carbon dioxid. The calcium oxid produced in the retort 8 may be used in making the milk of lime, which may be hydrated in the receptacle 2 or in another receptacle, and the water mixture directed into the vat 2. The carbon dioxid, which may be collected from the lime kiln or retort 8, formed in calcining the lime stone, and also some of that which may be produced by the burning of the fuel, may be directed under pressure into the bottom of the closed receptacle 6 through a pipe 9, which terminates in a coiled pipe 10 within the receptacle 6. The coiled pipe 10 is provided with a plurality of openings 11 through which the gas enters the receptacle 6 under more or less pressure and operates to some extent to further intimately mix the solutions received from the receptacle 5.

The carbon dioxid arising from the coiled pipe 10 operates to precipitate the milk of lime which brings down with the precipitate, the impurities, the foreign matter and the pulp from the vegetable compounds or material and the calcium hydroxid to form carbonates, hydroxids and other compounds of many of the elements contained in the solutions. The agitated solution containing the precipitate is directed through the pipe 12 and the valve 13 into the receptacle 14, which is provided with a plurality of cloth filter trays 15 through which the solution is forced in series. The receptacle 14 is provided with a cover 16, which may be closed and locked to the top of the receptacle 14 in any way that is desired.

As the solution passes through the filter the precipitate collects upon the trays and the filtered solution passes out through the pipe 17 and the valve 18. The composition, that is, the precipitate, which collects on the cloths, is removed by lifting the trays from the filter 14 and depositing the precipitate into any suitable receptacle or container after which it may be dried and, if desired, dehyrated to a greater or less extent.

The composition, which is thus formed, contains about two-thirds part calcium carbonate, about one-tenth part magnesium carbonate, and about one-tenth part pulp and the like, such as sugar and organic matter; also it contains a small amount of compounds of iron, aluminum, potassium and phosphorus and nitrogenous compounds.

The milk of lime being intimately mixed with the vegetable juices and precipitated by the carbon dioxid causes an exceedingly intimate mixture of the ingredients. The result is that the ingredients are brought together in a mass in an exceedingly finely divided state, which, upon combining in a composition, when dried, forms a mass of matter which is homogeneous and perfectly uniform in character and composition. The result is that objects made from the mass are perfect in character and in form. Chalk and wax crayons made from the composition of the mixture formed from the material in the finest possible state of division most perfectly mixed do not scratch. Plastics and carton-pierres are perfect in form and correspond exactly to the mold. Putty formed from the composition is consistent and exceedingly pliable and insertible in the smallest cavities or recesses, and will fill grains of wood and the like; and artificial stone, brick or tile made from the composition are uniform in structure. The pulp and sugar form in the composition a perfect binder for the intimately mixed particles of the composition.

The composition may be formed in the process of making sugar. It may be obtained, as a bi-product in such process, in the clarification of the beet or cane juices.

Having thus described my invention, what I claim as new, and desire to secure by Letters Patent, is,—

The composition for crayons, plastics, and the like, having a chemically precipitated mixture of about 66% calcium carbonate, 7% of magnesium carbonate, 10% of organic matter and a trace of sugar and about 17% of oxids of iron and aluminum and nitrogenous compounds.

In testimony whereof, I have hereunto signed my name to this specification in the presence of two subscribing witnesses.

WILLIAM B. ROSEVEAR, Jr.

Witnesses:
F. E. AUL.
R. G. ALLEN.